(12) United States Patent
Kil et al.

(10) Patent No.: US 8,300,245 B2
(45) Date of Patent: Oct. 30, 2012

(54) DEVICE TO EDIT DOCUMENTS FOR PRINTOUT AND METHOD THEREOF

(75) Inventors: Hyun-sub Kil, Daejeon (KR); Jae-ho Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1112 days.

(21) Appl. No.: 11/283,878

(22) Filed: Nov. 22, 2005

(65) Prior Publication Data

US 2006/0126140 A1 Jun. 15, 2006
US 2007/0247682 A2 Oct. 25, 2007

(30) Foreign Application Priority Data

Dec. 10, 2004 (KR) .................. 10-2004-0104158

(51) Int. Cl.
*G06F 3/12* (2006.01)
(52) U.S. Cl. ....... 358/1.15; 358/1.13; 358/1.9; 358/403; 399/81; 399/82; 399/83
(58) Field of Classification Search .................. 358/1.13, 358/1.15
See application file for complete search history.

(56) References Cited

U.S. PATENT DOCUMENTS

| | | | | |
|---|---|---|---|---|
| 5,809,167 A * | 9/1998 | Al-Hussein | .................. | 382/190 |
| 5,825,988 A * | 10/1998 | Collard et al. | ............... | 358/1.13 |
| 6,292,267 B1 * | 9/2001 | Mori et al. | .................... | 358/1.15 |
| 6,671,063 B1 * | 12/2003 | Iida | .............................. | 358/1.15 |
| 6,714,316 B1 * | 3/2004 | Nishiyama | .................... | 358/1.18 |
| 7,034,954 B1 * | 4/2006 | Utsunomiya | ............... | 358/1.16 |
| 2001/0038463 A1 * | 11/2001 | Ishikawa | ..................... | 358/1.16 |
| 2001/0043346 A1 * | 11/2001 | Roztocil et al. | ............... | 358/1.9 |
| 2002/0041386 A1 * | 4/2002 | Suzuki et al. | ................ | 358/1.13 |
| 2002/0097436 A1 * | 7/2002 | Yokoyama et al. | ............ | 358/2.1 |
| 2003/0011802 A1 * | 1/2003 | Nakagiri et al. | ............. | 358/1.13 |
| 2003/0159114 A1 * | 8/2003 | Nishikawa et al. | ........... | 715/530 |
| 2004/0233469 A1 * | 11/2004 | Kato | ............................ | 358/1.13 |
| 2005/0012940 A1 * | 1/2005 | Matsuda | ........................ | 358/1.1 |
| 2005/0088701 A1 * | 4/2005 | Uchida et al. | ................ | 358/3.28 |
| 2005/0105129 A1 * | 5/2005 | Takahashi | .................... | 358/1.15 |
| 2005/0141022 A1 * | 6/2005 | Aiyama | ........................ | 358/1.15 |
| 2007/0253020 A1 * | 11/2007 | Hull et al. | .................... | 358/1.15 |

FOREIGN PATENT DOCUMENTS

| | | |
|---|---|---|
| JP | 2000-132347 | 5/2000 |
| JP | 2003-11459 | 1/2003 |
| JP | 2003-44239 | 2/2003 |
| JP | 2003-44249 | 2/2003 |
| KR | 1999-59665 | 7/1999 |

* cited by examiner

*Primary Examiner* — Benjamin O Dulaney
(74) *Attorney, Agent, or Firm* — Stanzione & Kim, LLP

(57) ABSTRACT

A device and method of editing documents created in different application programs and stored in a storage unit of a printer to create a new document according to a minimum unit.

22 Claims, 6 Drawing Sheets

DEVICE TO EDIT DOCUMENTS FOR PRINTOUT AND METHOD THEREOF

CROSS-REFERENCE TO RELATED APPLICATIONS

This application claims benefit under 35 U.S.C. §119 from Korean Patent Application No. 2004-104158, filed in the Korean Intellectual Property on Dec. 10, 2004, the entire contents of which are incorporated herein by reference.

BACKGROUND OF THE INVENTION

1. Field of the Invention

The present general inventive concept relates to a device to edit documents for printout, and more particularly, to a device to convert files created in diverse formats into files having a format for printout and to edit the converted files to generate new documents in the format for printout, and a method thereof.

2. Description of the Related Art

Image printout devices, such as photocopiers, printers, etc., print images on sheets of paper.

In particular, as the printers have multi-media functions, a variety of methods has been provided to conveniently use data created for printout. For example, there are known techniques for changing attributes of the data for printout corresponding to documents. That is, the techniques are accomplished with an additional function provided on a control panel of a printer in order for users to easily change attributes of the data for printout corresponding to documents (referred to as 'documents') even in the printer.

Hereinafter, a conventional method for changing attributes of documents will be described.

In general, a user creates the documents of various types, such as text documents, using an application program, and sends the documents to a printer for printing. The user assigns attributes to the documents. The documents can be secure documents (SD), general documents (GD), delay documents (DD), etc., depending on the attributes assigned to the documents, and the user assigns one of the attributes to the documents if required.

The secure documents (SD) refer to an attribute assigned to confidential documents requiring users to input a password before printing. When the user creates a secure document, assigns a password to the secure document, and stores the secure document, the password is generally processed into a printer job language (PJL), inserted in a header of the secure document, and codified. In a printer having a security authentication function, the password of the secure document is compared with a password input by a user, and the document is printed out by the printer if the user-input password and the secure document password are matched. Thus, to print the secure document, the printer has to have the security authentication function.

The general documents (GD) refer to an attribute of documents that can be printed without any password, unlike the secure documents. The delay documents (DD) refer to an attribute assigned to documents that are printed with a time delay set by the user.

The user-assigned attributes are added to a header portion of the documents and stored in an internal memory, and the stored attributes of the documents are referred to when the documents are printed.

FIG. 1 is a flow chart illustrating a conventional method for changing an attribute of documents stored in a printer.

In a step S10, if a document attribute change command is received from a user, document attributes, user names, and document titles are read from header portions of the documents stored in a memory of the printer, and displayed on a Liquid Crystal Display (LCD) unit of a control panel (not shown) of the printer.

In a step S20, the user selects a document from listed documents to change the document attributes. In detail, if the user wishes to change the document attributes, the user clicks on the selected document, and presses an attribute change button (not shown). If the user presses the attribute change button, the control panel displays a window prompting the user to select one of the secure documents, general documents, and delay documents.

In a step S30, if the user wishes to change the document attribute to convert a secure document into a general document, the step 30 requests the user to input a password in order to decide whether the user-input password matches a password added to the header portion of the secure document.

If the user-input password matches the password included in the header portion of the secure document, the user can change the document attribute of the secure document.

In a step S40, the user can change the document attributes of the selected documents. If the user wishes to delete some documents, the user can press a delete button (not shown) to delete the corresponding documents. Further, if the user wishes to change the attributes to convert the general document into the secure document, the user selects the general document to be converted into the secure document, and types the password in a 'password input' window. If the user presses an OK button, the general document is changed into the secure document. Further, if the user wishes to change the attributes to convert the general document into the delay document and the user selects the general document to be changed into the delay document, a 'delay time input' window appears. If the user types a time delay and presses the OK button, the general document is changed into the delay document.

As stated above, the techniques for changing the attributes of the documents that are stored in the memory of the printer are used as methods to conveniently change the created data for printout. However, changing the document attributes does not mean editing or changing data which is content of the documents. That is, the techniques change only attributes deciding when and how to process the documents, but do not change the content of the documents, nor edit and change the documents created in different formats (applications).

SUMMARY OF THE INVENTION

The present general inventive concept provides a device to easily edit documents for printout created on a terminal in different application programs (formats) and to create new documents, and a method thereof.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a method of editing documents on a printer storing and printing one or more received documents, the method comprising displaying a list of documents stored in a storage unit of the printer, selecting one or more target documents from the displayed list of documents, and editing the selected one or more target documents to generate new documents.

The editing of the selected one or more target documents may comprise one of copying and deleting a minimum unit of each target document stored in the storage unit.

The storage unit of the printer may be an external storage medium, such as a hard drive (HDD) connected thereto.

The foregoing and/or other aspects of the present general inventive concept may also be achieved by providing a method of editing documents on a terminal connected to a printer and a network, the method comprising displaying on a display unit documents stored in the printer, selecting one or more documents from the displayed documents, editing the selected one or more documents to generate new documents, and sending the generated new documents to the printer to print or store the same therein.

The editing of the selected one or more documents may comprise performing one of copying and deleting data of a minimum unit from the documents stored in the printer.

The foregoing and/or other aspects of the present general inventive concept may also be achieved by providing a method of editing documents on a terminal connected to a printer and a network, the method comprising selecting one or more documents to edit the selected documents stored in the printer, inputting a command to edit the selected documents, sending the command to the printer, editing the selected one or more documents according to the command in the printer to create new documents.

The editing of the selected one or more documents may be performed according to a minimum unit of the selected one or more documents stored in a memory.

The foregoing and/or other aspects of the present general inventive concept may also be achieved by providing a device usable with a printer to store one or more received documents in a storage unit, to edit the stored documents, and to print the edited documents, the device comprising an input unit to select a new document-creating mode to create a new document, a display unit to display characters and a setup window corresponding to key inputs from the input unit, and a control unit to list the documents stored in the storage unit on the display unit in order to select at least one of the one or more documents to be edited so as to generate the new document, if the new document-creating mode is selected through the input unit.

The control unit may edit the one or more selected documents by performing one of copying and deleting data of a minimum unit from the individual documents stored in the storage unit. The storage unit of the printer may be an external storage medium, which can be an HDD connectable to the printer.

The foregoing and/or other aspects of the present general inventive concept may also be achieved by providing a device usable with a terminal connected to a printer through a network to edit documents, the device comprising an input unit to select a new document-creating mode to create a new document, a display unit to display characters and a setup window corresponding to key inputs from the input unit, and a control unit to list the documents stored in the printer on the display unit, to select one or more documents to be edited to generate the new document, if the new document-creating mode is selected through the input unit.

The control unit may send the new document to the printer to print or store the same.

The control unit may edit the one or more selected documents by one of copying and deleting data of a minimum unit from the documents stored in the printer.

The foregoing and/or other aspects of the present general inventive concept may also be achieved by providing a device usable with a terminal connected to a printer through a network to edit documents, the device comprising an input unit to select one or more documents stored in the printer to edit, and to input a command related to the editing of the selected one or more documents, and a control unit to send the command to the printer, and to carry out the command in the printer to create a new document by editing the selected one or more documents.

The control unit carries out the command to create the new document in the printer by performing one of copying and deleting data of a minimum unit from the documents stored in the printer.

The foregoing and/or other aspects of the present general inventive concept may also be achieved by providing a network system including a storage unit to store a first document having one or more first minimum units and a second document having one or more second minimum units, and a controller to combine at least one of the one or more first minimum units of the first document with at least one of the one or more second minimum units of the second document to generate a new document.

The foregoing and/or other aspects of the present general inventive concept may also be achieved by providing a method of a network printer system including storing a first document having one or more first minimum units and a second document having one or more second minimum units, and combining at least one of the one or more first minimum units of the first document with at least one of the one or more second minimum units of the second document to generate a new document.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
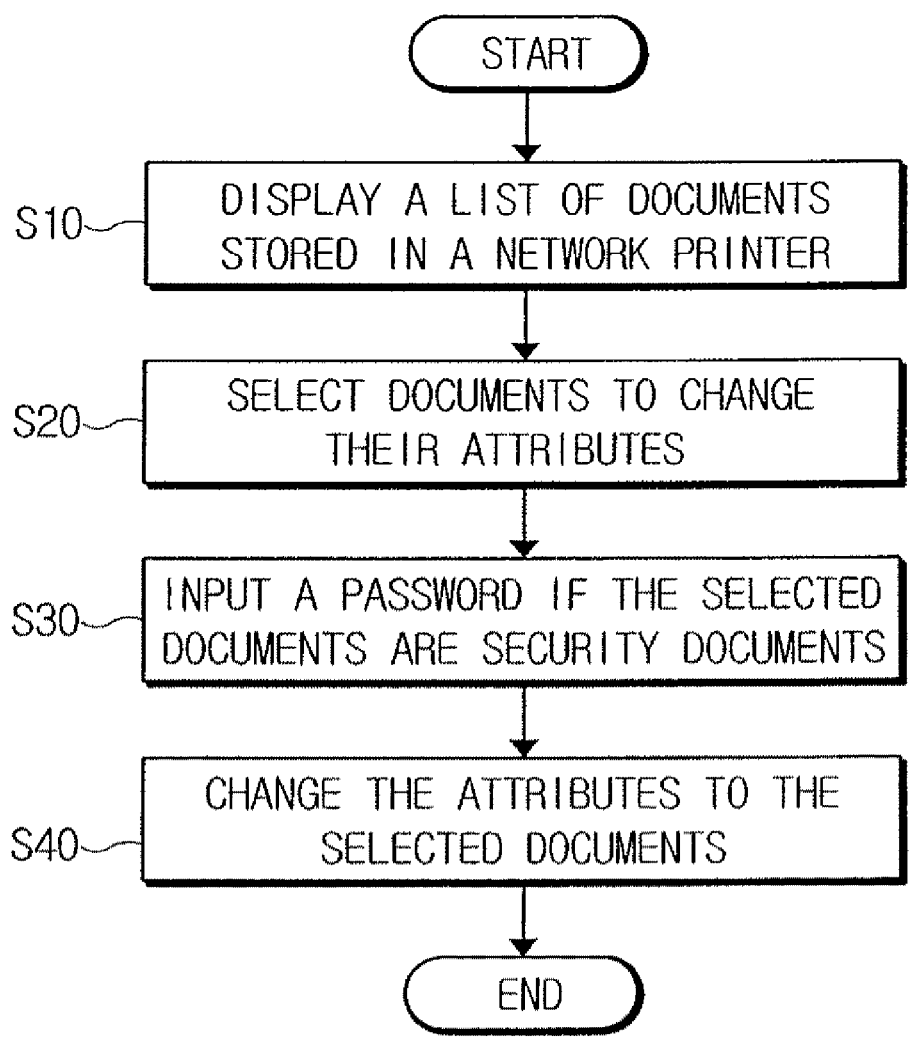
FIG. 1 is a flow chart illustrating a conventional method for changing attributes of documents stored in a printer.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
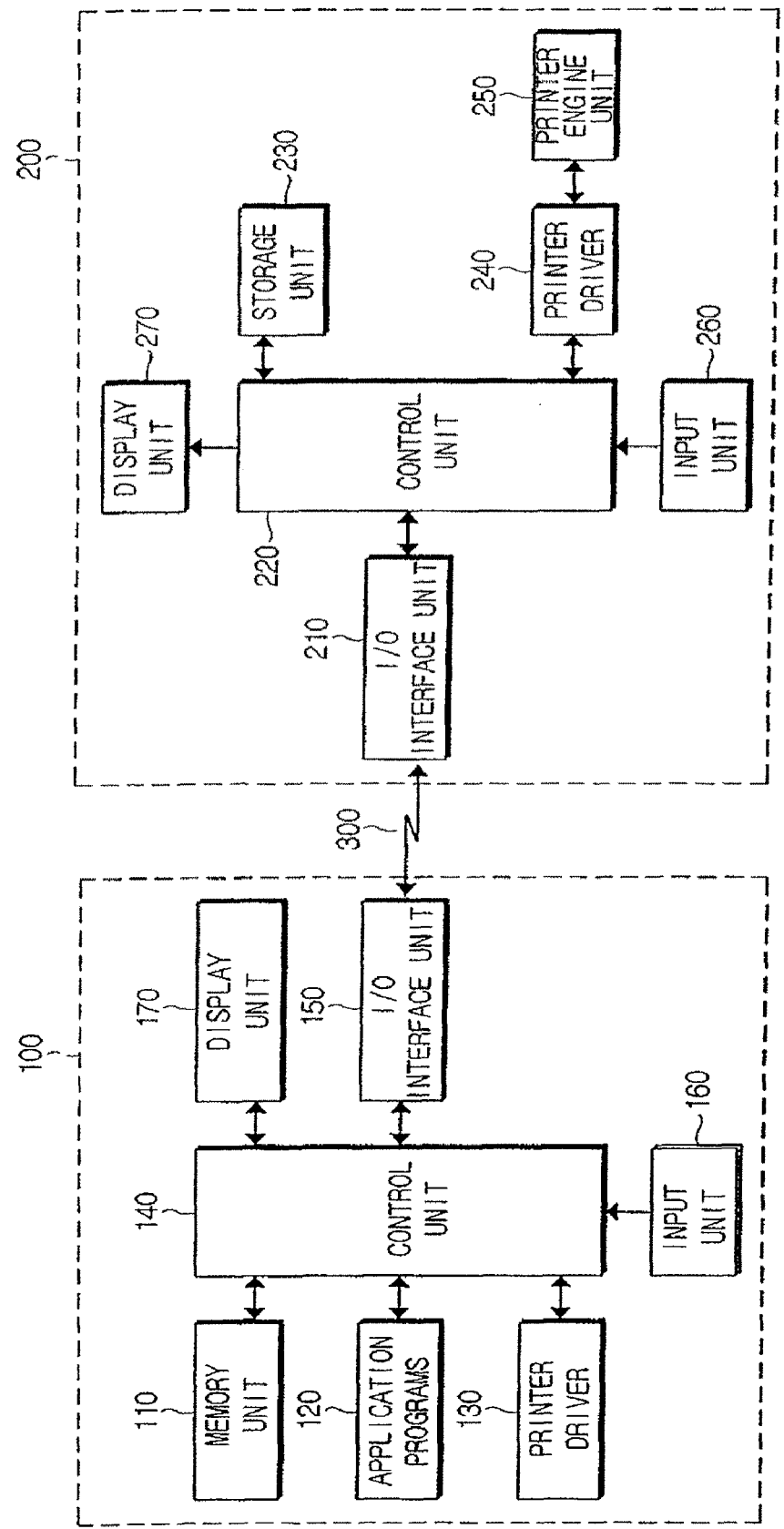
FIG. 2 is a block diagram illustrating a structure of a network printer system according to an embodiment of the present general inventive concept.

FIG. 2 is a block diagram illustrating a structure of a network printer system according to an embodiment of the present general inventive concept. In FIG. 2, the network printer system has a terminal 100 connected to a network 300 and a printer 200. The printer may be a network printer.

The terminal 100 has a memory unit 110, application programs 120, a printer driver 130, a control unit 140, an I/O interface unit 150, an input unit 160, and a display unit 170. The terminal 150 may be a host computer.

The application programs 120 are programs to generate document data, such as word documents, image documents, etc.

A user generates the document data corresponding to one or more documents using the application programs 120 and a menu to set printout options. The printer driver 130 converts the document data into data for printout that a printer can recognize, and the control unit 140 sends the data for printout to the network printer 200 through the I/O interface unit 150. In the network printer 200, the data for printout may be stored in a storage unit 230 or converted in a bitmap format. The bitmap data stored in the network printer 200 is referred to one or more 'files' each containing one or more pages to be printed. A process of printing the bitmap data or each file is referred to as 'job.' The one or more documents correspond to the document data, the data for printout, or the bitmap data.

The memory unit 110 stores various data generated in the application programs 120, an operating program to control the terminal 100, and graphic user interfaces (GUIs) of a job-selecting window (illustrated in FIG. 4) and a job-editing window (illustrated in FIG. 5) according to this embodiment.

The input unit 160 is provided with one or more keys enabling the user to set various functions supported by the terminal 100. The input unit 160 generates and sends various key data to the control unit 140. In addition to conventional keys, according to this embodiment, the input unit 160 is provided with a menu key enabling the user to change modes to a printout mode or a new job-creating mode wherein the printout mode enables the user to print the bitmap data stored in the storage unit 230 of the printer 200, that is, to execute the jobs, and the new job-creating mode enables the user to edit the jobs, a cursor-moving key, a delete key, and a selection key enabling a user to select jobs.

The I/O interface unit 150 interfaces the terminal 100 and the network printer 200 through the network 300 to send and to receive data.

Figure 4:
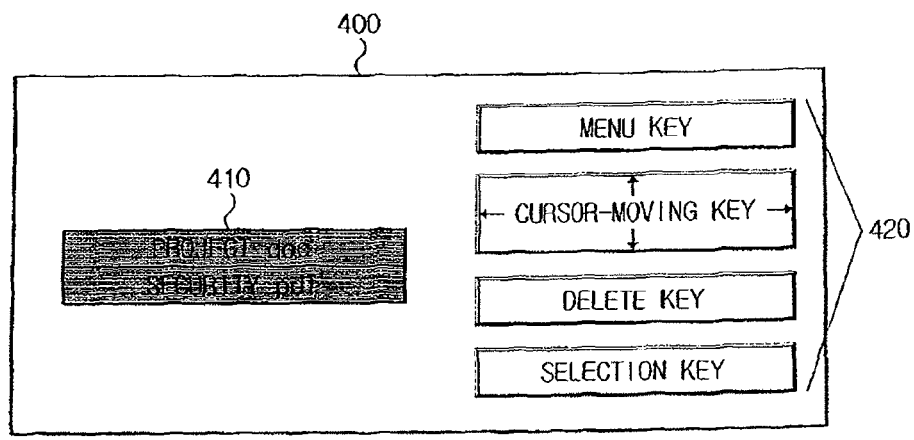
FIG. 4 is a view illustrating a job-selecting window.
Figure 5:
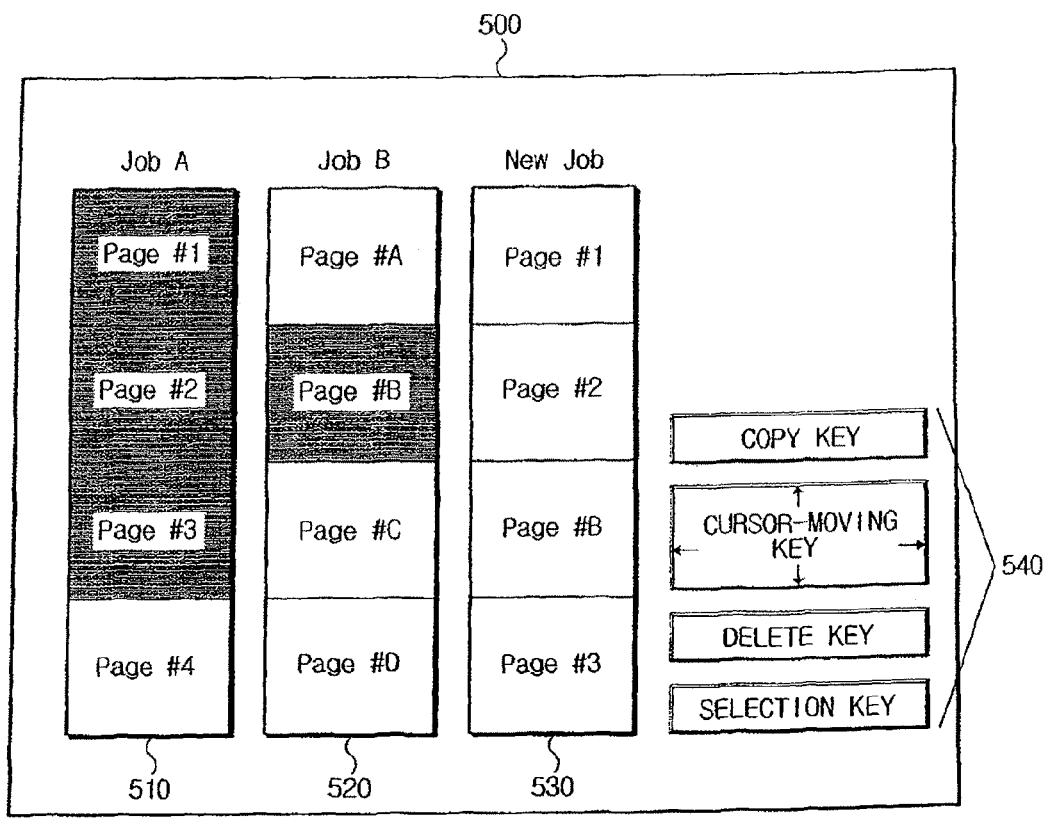
FIG. 5 is a view illustrating a job-editing window.

The display unit 170 is controlled by the control unit 140 and may display various windows related to operations performed by the terminal 100. Further, the display unit 170 may display characters and setup windows corresponding to the keys input from the input unit 160. That is, if the user selects the new job-creating mode using the menu key or the input keys directly, the display unit 170 displays a job-selecting window 400 as illustrated in FIG. 4, and, if the user selects a job or one or more files, the display unit 170 displays a job-editing window 500 as illustrated in FIG. 5.

The control unit 140 has a function of controlling components of the terminal 100, and, according to the present embodiment, the control unit 140 enables the user to upload or read a document which is to be printed or stored as bitmap data in the network printer 200, so as to edit the bitmap data corresponding to the document in the application programs 120, to store the edited bitmap data corresponding to the document as a new file, and to print the new file (document) using the network printer 200 or to store the new file in the storage unit 230 of the network printer 200. Further, the control unit 140 may use an user interface (UI) program to build an EDIT window enabling the user to edit the bitmap data corresponding to the document, sends an editing-related command to the network printer 200 in order for the network printer 200 to generate, print, or store the new file in the storage unit 230 according to the editing-related command.

The network printer 200 includes an I/O interface unit 210, a control unit 220, an input unit 260, the storage unit 230, a printer driving unit 240, a printer engine unit 250, and a display unit 270.

The I/O interface unit 210 is connected to the network 300 to receive the data for printout from the terminal 100, and to send the received data for printout to the control unit 220 or to send the document corresponding to the bitmap data stored in the storage unit 230 to the terminal 100.

The storage unit 230 stores as the document the bitmap data corresponding to the data for printout sent from the terminal 100, initialization programs, an operating program, etc., for the network printer 200. Here, the storage unit 230 stores the bitmap data converted from the data for printout, together with information on printout formats included in the data for printout. That is, even though files or the document data of one or more pages can not be created into a single document format due to use of different applications in the terminal 100, the files can be edited since the files are all stored in the storage unit 230 as the bitmap data of the bitmap format. Here, the storage unit 230 can be a memory or a hard disc. Further, the storage unit 230 stores the GUIs for the job-selecting window (illustrated in FIG. 4) and the job-editing window (illustrated in FIG. 5).

Hereinafter, the job-selecting window and the job-editing window will be described with reference to FIG. 4 and FIG. 5.

The job-selecting window 400 is a GUI window displayed on the display unit 270 if the job-creating mode or the new job mode is selected through the input unit 260. The job-selecting window 400 includes a job-list display unit 410 and a related key input unit 420. The related key input unit 420 can be a touch panel for direct inputs, and corresponding keys can be selected from the input unit 260 instead of using the key input unit 420 of the job-selecting window 400.

A process of selecting two different jobs and generating a new job will be described hereinafter. The job-list display unit 410 displays a list of the bitmap data corresponding to one or more documents of one or more pages stored in the storage unit 230, that is, displays a job list. Each job corresponds to the bitmap data of the document of one or more pages. The job-list display unit 410 is built to enable the user to select one or more target jobs from the job list using the related key input unit 420, that is, first and second target jobs to be edited. Next, if the target jobs are selected, the job-editing window 500 (illustrated in FIG. 5) is displayed on the display unit 270.

As illustrated in FIG. 5, the job-editing window 500 displays a first target job display part 510 having unit jobs stored as the first target jobs which the user wishes to edit, and displays a second target job display part 520 having unit jobs stored as the second target jobs the user wishes to edit. Here, a unit job refers to a minimum unit that can be changed, stored, or displayed depending on a size of the storage unit 230. That is, a page can be the minimum unit for the storage unit 230 in which each page is stored in bitmap format as a minimum storage amount, and a paragraph can be the minimum unit for the storage unit 230 if the job is divided into paragraphs that can be stored, changed, or displayed separately. The present embodiment is described with page-by-page storage, but, if the bitmap data corresponding to one page is divided into several unit paragraphs for storage, an edit job can be performed using the unit paragraphs.

A new job-creating display part 530 displays the bitmap data in a unit of page that is copied, and the page-by-page bitmap data are added, as new unit jobs, to a new job list and stored in the storage unit 230.

A related key input unit 540 displays keys that can be used on the job-editing window 500. In the network printer 200, the job-editing window 500 may be displayed on a touch panel for direct inputs, and corresponding keys can be selected through the panel instead of the related key input unit 540.

Referring to FIG. 5, a new job of four pages is generated by adding or copying pages #1, #2, and #3 of a job A and by inserting page #B of a job B between the pages #2 and #3 of the job A. That is, the pages #1 and #2 of the job A are first copied and added in order as the first and second pages of the new job, the page #B of the job B is copied and placed as the third page of the new job, and the page #3 of the job A is copied and added as the fourth page to the new job, through the related key input unit 540. For a convenient explanation, the jobs of "PROTECT.doc" and "SECURITY.pdf" selected on the job-selecting window 400 have been explained as the "job A" and the "job B," respectively.

As stated above, even though documents may be created as the document data in different formats by different application programs 120 on the terminal 100, the data for printout corresponding to the documents can be stored in the same bitmap format in the storage unit 230 of the network printer 200, so that the bitmap data can be edited together on the network printer 200.

The control unit 220 controls the network printer 200, and, in particular, if the user selects the new job-creating mode through the input unit 260, the control unit 220 controls the display unit 270 to display the job-selecting window 400 containing a list of jobs stored in the storage unit 230. Further, if the user selects an edit job to create the new job, the control unit 220 reads the job-editing window 500 from the storage unit 230 and controls the display unit 270 to display the job-editing window 500. Next, if the user selects a printout mode, the control unit 220 controls the printer driving unit 240 to print the corresponding job.

The printer driving unit 240 drives the printer engine unit 250 according to a control command of the control unit 220, and the printer engine unit 250 prints on sheets of paper the bitmap data corresponding to the data for printout that is received from the terminal 100 according to the controls of the printer driving unit 240. In general, the printer engine unit 250 is provided with a paper feeder, a photosensitive drum, a charger, a light-scanning device, a developer, and a transfer roller, but a detailed description of the components is omitted.

The input unit 260 is provided with a plurality of keys enabling the user to set various functions supported by the network printer 200. The input unit 260 generates and sends various key data to the control unit 220. In addition to the plurality of keys, the present embodiment is provided with a menu key enabling the user to change modes to the printout mode in which the user can print the jobs stored in a memory, and to the new job mode enabling the user to edit the jobs, a cursor-moving key, a delete key, and a selection key. Here, instead of separate keys as in case of the terminal 100, one key can be used as an input key for different commands according to a key input order. The above keys can be added as actual buttons in a hardware manner to a panel of the input unit 260, or can be installed in a software manner to be used with a touch screen, such as a Liquid Crystal Display (LCD).

The display unit 270 is controlled by the control unit 220 to display various operation states of the network printer 200. Further, the display unit 270 may display characters and a setup window corresponding to the key data input from the input unit 260. That is, if the user selects the new job mode using the menu key or a direct input key, the display unit 270 displays the job-selecting window 400, and, if the user selects the edit job, the display unit 270 displays the job-editing window 500. The display unit 270 can be an LCD unit, which may form a panel together with the input unit 260.

Hereinafter, a method of re-formatting (or editing) one or more documents according to the embodiment of the present general inventive concept will be described using the above described structure.

Figure 3:
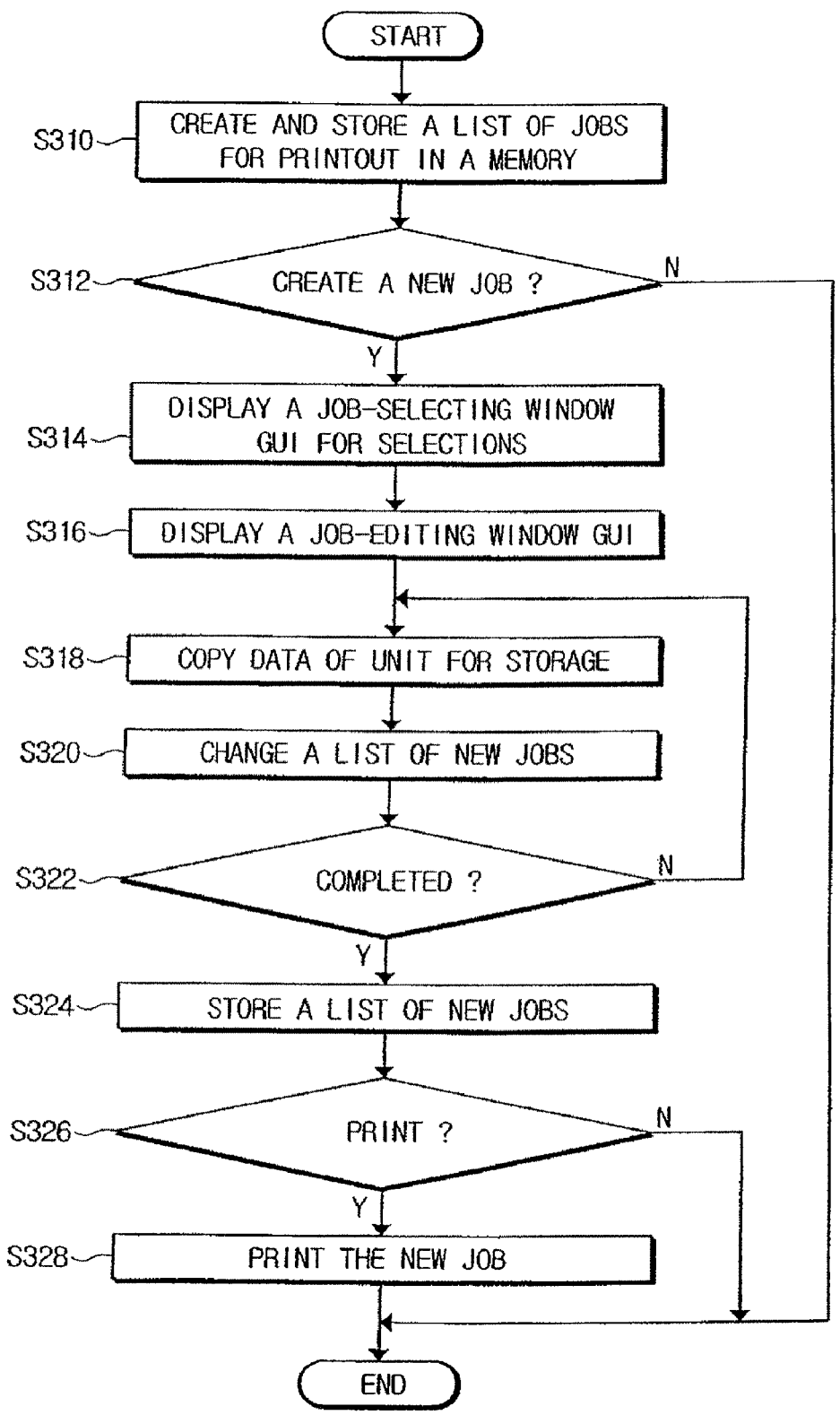
FIG. 3 is a flow chart illustrating a method re-formatting documents according to an embodiment of the present general inventive concept.

FIG. 3 is a flow chart illustrating the method of re-formatting or editing a document. Referring to FIGS. 2 and 3, the printer driver 130 converts the created document data into the data for printout that the network printer 200 can recognize, using the application programs 120 and sends the data for printout to the network printer 200 through the I/O interface unit 150 and the network 300, so that the network printer 200 stores in the storage unit 230 the data for printout sent from the I/O interface unit 210 (operation S310). The data for printout can be stored as the bitmap data.

The control unit 220 decides whether the user input a mode for creating a new job through the input unit 260 (operation S312). If the user has selected the new job mode in the operation S312, the control unit 220 controls the job-selecting window 400 stored in the storage unit 230 to be displayed on the display unit 270, so as to enable the user to select at least one or more edit job modes (operation S314). The detailed description of selecting the edit job modes using the job-selecting window 400 is the same as the above-described mode. If the user has selected the edit job mode in the operation S314, the control unit 220 controls the job-editing window 500 stored in the storage unit 230 to be displayed on the display unit 270, and stores the newly created new job in the storage unit 230 as new data for printout (operation S316). The control unit 220 enables the user to perform edit procedures, such as copying, deleting, etc., with bitmap data according to a minimum unit (operation S318). Here, as described above, the data for printout or the bitmap data can be edited, copied, stored or displayed based on each minimum unit, so that editing can be done with more precision if the minimum unit is smaller.

Every time a new job is edited, the control unit 220 stores the new job as new bitmap data in the storage unit 230 through updating the storage unit 230 (operation S320). The jobs having one or more pages formed in bitmap data in the minimum unit are edited according to the minimum unit to create the new job having one or more pages of the bitmap data in the minimum unit.

If the editing mode is completed (operation S322), the control unit 220 updates the list of jobs stored in the storage unit 230, and stores the new job list in the storage unit 230. If the editing mode is not completed, the control unit 220 repeats the operations S318 to S322.

Next, if a printout command is input through the input unit 260 (operation S326), the control unit 220 controls the printer driving unit 240 to print the new job, so that the printer engine unit 250 prints the new job. For example, the page #1, page #2, page #B, and page #3 of the new job of FIG. 5 can be printed according to the printout command.

Although, the documents or files are edited in the network printer 200 when the job-selecting window 400 or the job-editing window 500 is displayed on the network printer 200, the terminal 100 connected to the printer 200 through the network 300 may upload and edit the documents or files stored in the network printer 200, create a new file, and send the new file to the network printer 200, so as to print or store the newly created file.

Figure 6:
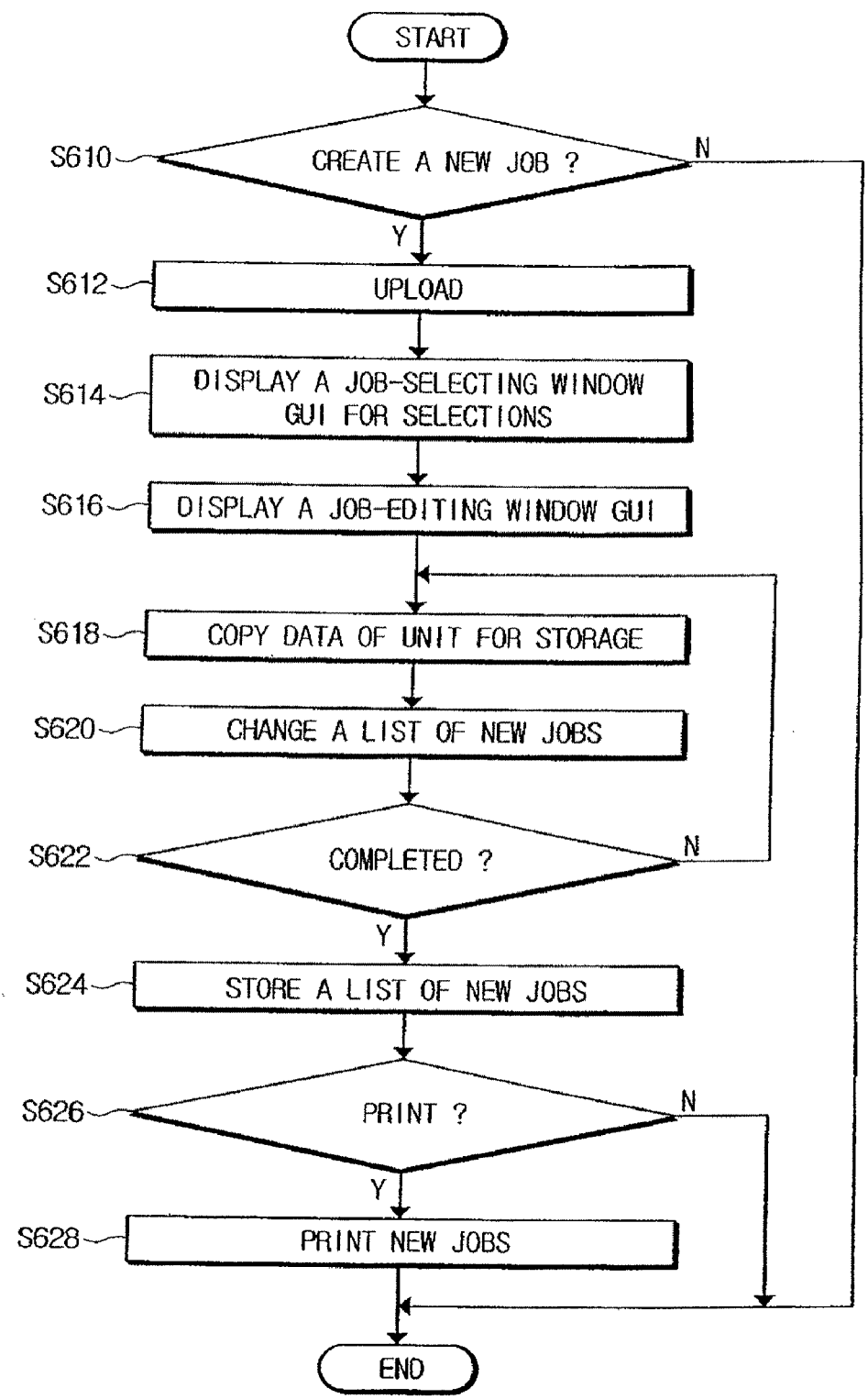
FIG. 6 is a flow chart illustrating a method of re-formatting documents on a terminal according to an embodiment of the present general inventive concept.

FIG. 6 is a flow chart illustrating a method for re-formatting or editing a document in the terminal 100 of FIG. 2 according to an embodiment of present general inventive concept.

Referring to FIGS. 2 and 6, the control unit 140 of the terminal 100 decides whether the user inputs a mode for creating a new job through the input unit 160 (operation S610).

If the user selects the new job mode in the operation S610, the control unit 140 receives the list of the bitmap data stored in the storage unit 230 of the network printer 200 (operation S612), controls the job-selecting window 400 stored in memory unit 110 to be displayed on the display unit 170, so that the user can select an edit mode to edit at least one or more jobs (operation S614). If the user selects the one or more jobs, that is, an edit job, the control unit 140 controls the job-editing window 500 stored in the memory unit 110 to be displayed on the display unit 170 (operation S616). The control unit 140 stores a newly created new job in the memory unit 110 as new data for printout, and enables the user to perform edit procedures such as copying and deleting data according to the minimum unit of each job (operation S618). Here, the minimum unit can be a unit to be copied, deleted, stored, displayed as a unit job of each job as described above, so that editing can be done as a volume of the minimum unit is decreased.

Every time a job is edited to create a new job in the terminal 100, the control unit 140 stores the new job as the data for printout in the memory unit 110 by updating the memory unit 110 (operation S620).

If the editing of the job is completed (operation S622), the control unit 140 updates the memory unit 110 with a new job list, and sends the new job list to the storage unit 230 of the network printer 200 (operation S624). If the editing of the job is not completed, the control unit 140 repeats the operations S618 to S622.

Next, if the printout command is input through the input unit 160 (operation S626), the control unit 140 controls the network printer 200 to print the new job (operation S628).

Further, in another embodiment of the present general inventive concept, the terminal 100 may send an edit command to the network printer 200 using an UI (user interface) window to create or store a new job in the network printer 200.

Figure 7:
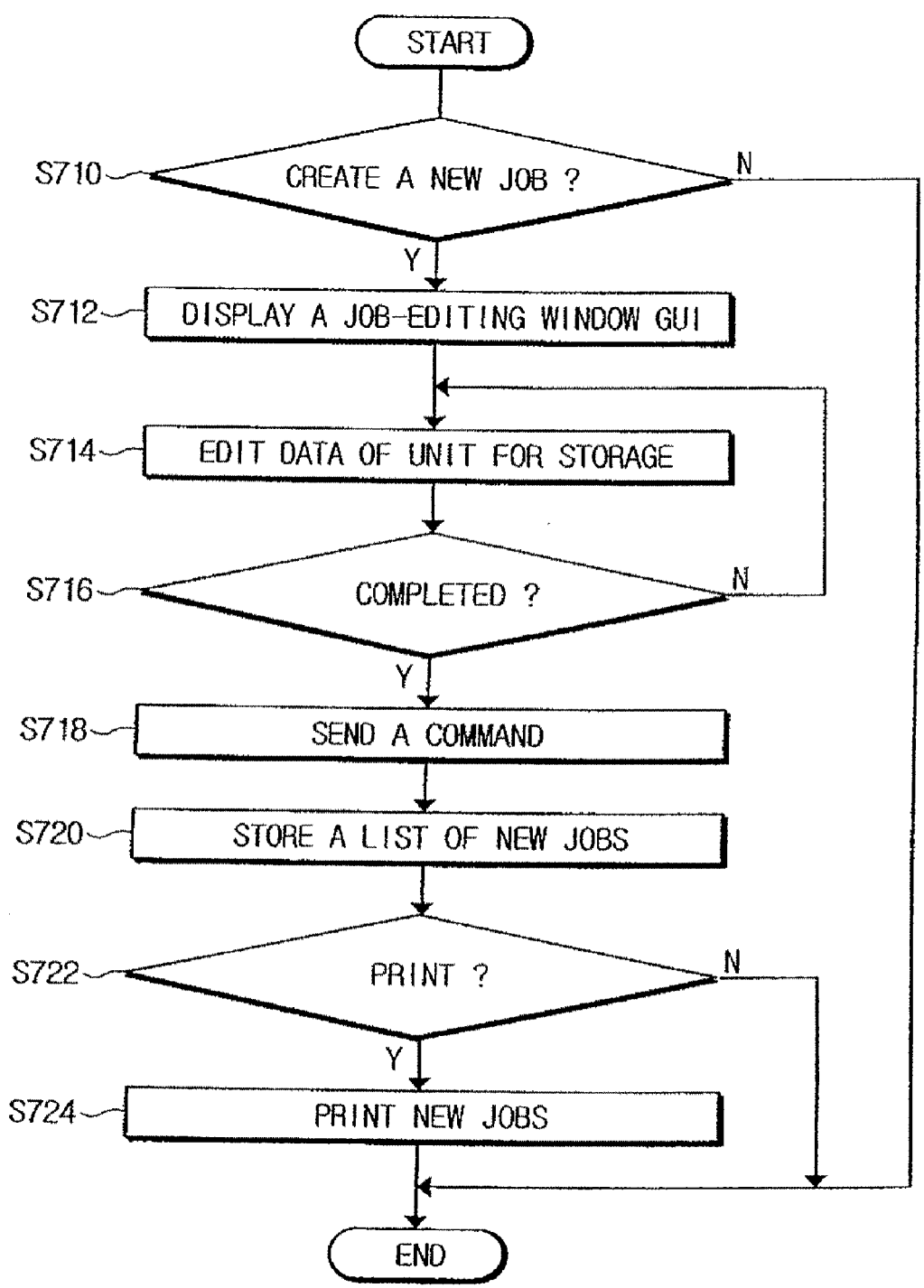
FIG. 7 is a flow chart illustrating a method of re-formatting documents on a terminal according to an embodiment of the present general inventive concept.

FIG. 7 is a flow chart illustrating a method for re-formatting or editing a document on the terminal 100 of FIG. 2 according to an embodiment of the present general inventive concept. Referring to FIGS. 2 and 7, the control unit 140 of the terminal 100 decides whether the mode for creating a new job is input through the input unit 160 (operation S710). If the user selects the new job mode in the operation S710, the control unit 120 displays the job-editing window GUI (operation S712), and enables the user to edit data according to a minimum unit (operation S714). Here, the job-editing window GUI provides an EDIT window enabling the user to input commands, for example, enabling the user to select a specific page, which is referred to as a unit job of the job, and a certain job out of a job list and to edit the selected job. For example the user can input a command for editing page #2 of "job A" and page #3 of "job B" to create the new job in which page #2 of job A and page #3 of job B are arranged as first and second pages of the new job.

If the editing is completed in the operation S714, the control unit 140 sends the edited command to the control unit 220 of the network printer 200 (operation S718), and the control unit 220 enables the user to edit a corresponding job according to the sent command and to store a new job list having the new job in the storage unit 230 (operation S720). Next, if a command for printing the new job is sent (operation S722), the control unit 220 controls the printer driving unit 240 to print the new job through the printer engine unit 250. The above structure of the network printing system is convenient for a user to edit the respective jobs.

As aforementioned, the device and method of editing documents for printout enables a user to easily edit the documents in different file formats as one document by using bitmap files stored in the storage unit of the printer even though the user can not edit the corresponding documents as one document due to the different file formats on the terminal.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus connectable to a host device executing a printer driver, the host device to generate a first document using a first application program and a second document using a second application program, the host device using the printer driver to convert the first document and the second document into a first printing data file and a second printing data file and transmitting the first printing data file and the second printing data file to the image forming apparatus, the image forming apparatus comprising:
   a communication interface to receive the first printing data file and the second printing data file from the host device;
   a storage unit to store image data files corresponding to the first printing data file and the second printing data file and according to print instructions received by the image forming apparatus, each of the image data files containing one or more pages of data to be printed and excluding print control instructions;
   a display unit to display a list of image data files excluding print control instructions stored in the storage unit;
   an input unit to receive user input to select a first image data file and a second image data file from the displayed list of image data files excluding the print control instructions, the input unit to receive user input to select a merge option to merge the selected files and to receive user input to designate a page location of the second image data file in order to insert at least one page of the first image data file;
   a control unit to perform a merging operation to generate a new merged file by merging pages of the selected files in image data format according to the selected merge option; and
   a print unit to print the new merged file on sheets of printing medium,
   wherein the merging operation is performed while the selected image data files exist in the image data format that excludes the print control instructions.

2. The image forming apparatus as claimed in claim 1, wherein the control unit saves the created new merged file having no print instructions.

3. The image forming apparatus as claimed in claim 1, wherein the input unit is operable to receive a user command to print the new merged file.

4. The image forming apparatus as claimed in claim 1, further comprising an I/O interface unit to communication with terminal devices via a network, wherein the first image data file and the second image data file stored in the storage unit correspond to print data received from the terminal devices via the network.

5. The image forming apparatus as claimed in claim 1, wherein the first image data file and the second image data file stored in the storage unit are generated via a scanning unit of the image forming apparatus.

6. The image forming apparatus as claimed in claim 1, wherein the input unit selects one or more paragraphs to be deleted from the selected first image data file and second image data file, and the control unit generates a new merged file excluding print control instructions by merging the selected one or more paragraphs from the selected first image data file and the second image data file.

7. The image forming apparatus as claimed in claim 1, wherein the input unit is further operable to select a third image data file from the displayed list of image data files, wherein the control unit generates a new merged file excluding print control instructions by merging at least one page of the selected third image data file to the selected first and second image data files.

8. The image forming apparatus as claimed in claim 1, wherein the input unit receives an instruction to print the new merged file.

9. The image forming apparatus of claim 1, wherein the input unit is operable to select at least one delete page to be deleted from at least one of the selected first and second image data files, and
wherein the control unit creates the new merged file by merging pages of the selected first and second image data files with pages deleted therefrom according to the at least one delete page selected via the input unit.

10. The image forming apparatus of claim 1, wherein the stored image data file is divided into paragraphs that can be stored, changed, or displayed separately.

11. A method of generating a first document using a first application program stored in host device and a second document using a second application program stored in the host device and converting the first document and the second document using an image forming apparatus into a first printing data file and a second printing data file and transmitting the first printing data file and the second printing data file to the image forming apparatus, the method comprising:
sending the first printing data and the second printing data from the host device to the image forming apparatus;
storing image data files corresponding to the first printing data file and the second printing data file in the image forming apparatus and according to print control instructions received by the image forming apparatus, each of the image data files comprising at least one page of data to be printed and excluding print control instructions;
displaying a list of image data files excluding print control instructions stored in the image forming apparatus;
selecting a first image data file and a second image data file from the displayed list of image data files that exclude print control instructions;
designating a page location of the second image data file in order to insert at least one page of the first image data file; and
merging the selected first image data file and second image data file at the designated page location using the image forming apparatus,
wherein the merging of the selected first image data and the selected second image data is performed while the selected first image data and the selected second image data exist in an image data format that excludes print control instructions to generate a new merged file including the first image data file merged with the second image data file at the designated page location, and printing the new merged file on sheets of printing medium.

12. The method as claimed in claim 11, wherein the creating a new merged file that excludes print control instructions further comprises at least one of inserting a minimum unit of the selected second image data file into the selected first image data file and deleting a minimum unit of the one of the selected first and second image data files.

13. The method as claimed in claim 11, further comprising saving the new merged file as a new document that excludes print control instructions.

14. The method as claimed in claim 11, further comprising receiving a user input to print the new merged file.

15. The method as claimed in claim 11, wherein the first image data file and the second image data file are stored in the storage unit in a bitmap format.

16. The method as claimed in claim 11, wherein the first image data file and the second image data file stored in the storage unit of the image forming apparatus comprise documents received from terminal devices via a network.

17. The method as claimed in claim 11, wherein the first image data file and the second image data file stored in the storage unit of the image forming apparatus comprise documents including at least one page of data to be printed generated by scanning an image medium using a scanning unit of the image forming apparatus.

18. The method as claimed in claim 11, wherein the merging further comprises identifying an insertion location in the selected first image data file according to a user input, wherein at least one portion of one of the selected first and second image data files is inserted to the first image data file at the identified insertion location.

19. The method of claim 11, further comprising selecting at least one delete page to be deleted from at least one of the selected first and second image data files, and
creating the new merged file by merging pages of the selected first and second image data files with pages deleted therefrom according to a selected at least one delete page.

20. An image forming apparatus connectable to a host device executing a printer driver, the host device using the printer driver to convert documents into printer-driver-converted data files and transmitting the printer-driver-converted data files including printer control instructions to the image forming apparatus, the image forming apparatus comprising:
a communication interface to receive the printer-driver-converted files from the host device;
a print unit to perform printing operations based on the received printer-driver-converted files;
a display unit to display a list of image data files stored in the image forming apparatus corresponding to the printer-driver-converted files previously received from the host device, the image data files excluding printer control instructions;
an input unit to receive user input to select a plurality of image data files from the displayed list, the input unit to receive user input to select a merge option to merge the selected image data files excluding print control instructions and to receive user input to designate a page location where a first one of the selected files is to be inserted in relation to pages of a second one of the selected files; and
a control unit to perform a merging operation to generate a new merged file by merging pages of the selected image data files in an image data format excluding printer control instructions according to the user input designating the page location, and to control the print unit to print the new merged file on sheets of printing medium,
wherein the merging operation to merge pages of the selected files is performed while the selected files exist in the image data format that excludes printer control instructions.

21. The image forming apparatus of claim 20, wherein the host device generates a first document using a first application program and a second document using a second application program, and the first document and the second document are generated by the host device in a different data format, the host device using the printer driver to convert the first document and the second document into a first printer-driver-converted data file and a second printer-driver-converted data file and transmitting the first printer-driver-converted data file and the second printer-driver-converted data file to the image forming apparatus, and when pages of a first image data file and a second image data file, corresponding to the first printer-driver-converted data file and the second printer-driver-converted data file, are merged by the control unit, the first image data file and the second image data file are in a same image data format that excludes printer control instructions.

22. The image forming apparatus of claim 20, further comprising a storage unit to store the image data files corresponding to the printer-driver-converted files previously received from the host device.

* * * * *